United States Patent [11] 3,574,990

| [72] | Inventor | Robert A. C. Calder<br>Hamilton, Ontario, Canada |
|---|---|---|
| [21] | Appl. No. | 817,748 |
| [22] | Filed | Apr. 21, 1969 |
| [45] | Patented | Apr. 13, 1971 |
| [73] | Assignee | International Harvester Company<br>Chicago, Ill. |

[54] SUPPORT AND LINKAGE SYSTEM FOR HARVESTER PLATFORMS
10 Claims, 7 Drawing Figs.

[52] U.S. Cl. ................................................... 56/208
[51] Int. Cl. ..................................................... A01d 67/00
[50] Field of Search .......................................... 56/208, 192

[56] References Cited
UNITED STATES PATENTS

| 3,043,076 | 7/1962 | Scheidenhelm | 56/192 |
| 3,238,709 | 3/1966 | Williams | 56/208 |
| 3,266,230 | 8/1966 | Rowbotham | 56/208 |

*Primary Examiner*—Louis G. Mancene
*Assistant Examiner*—J. N. Eskovitz
*Attorney*—Noel G. Artman ABSTRACT: A self-propelled windrower having a wheeled frame and a harvester platform disposed forwardly of the frame for cutting and swathing a crop. The platform is mounted on the frame by arm means and is movable vertically by hydraulic lift cylinders. The platform is floatably suspended by torsion bar assemblies which are interconnected between the frame and arm means.

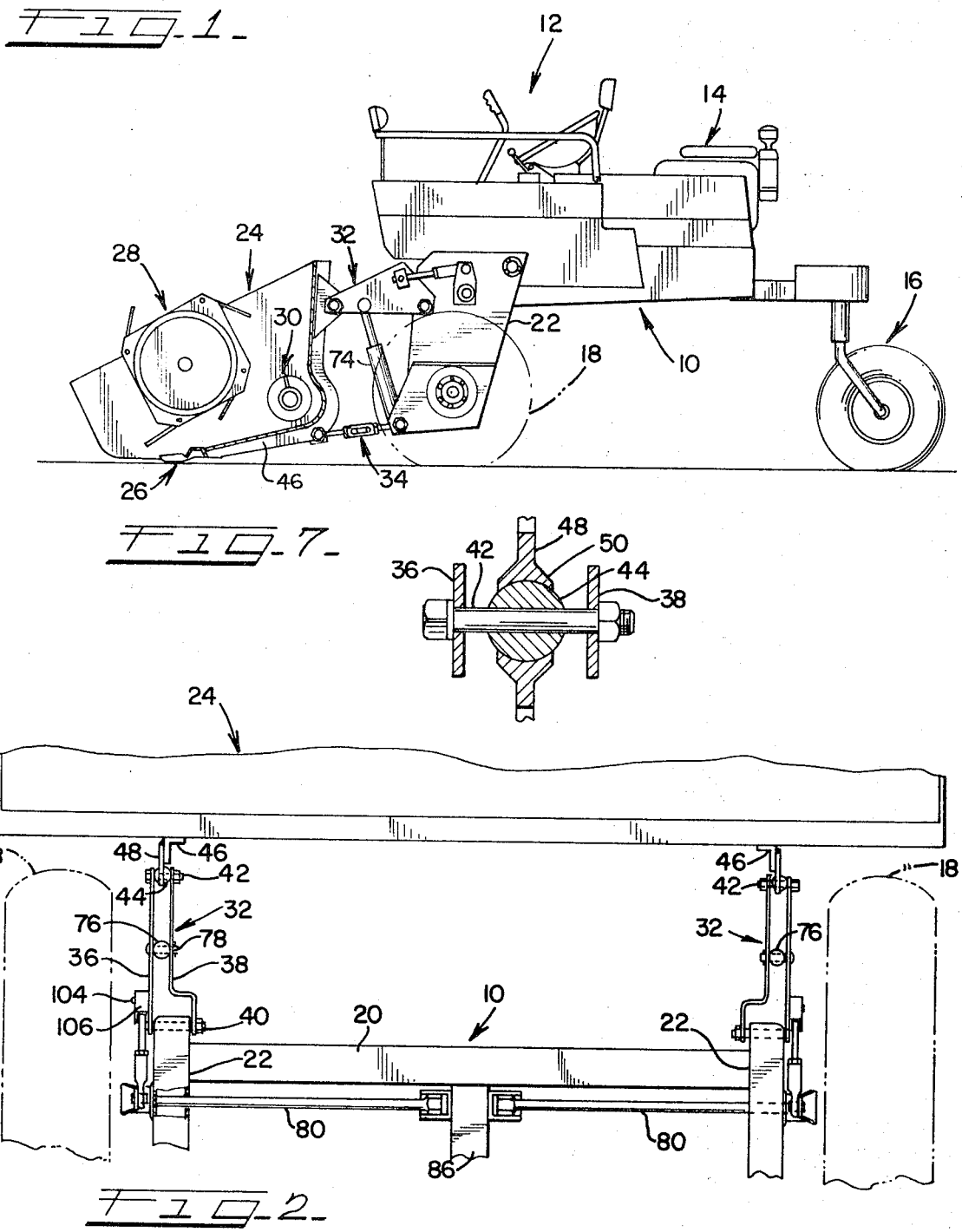

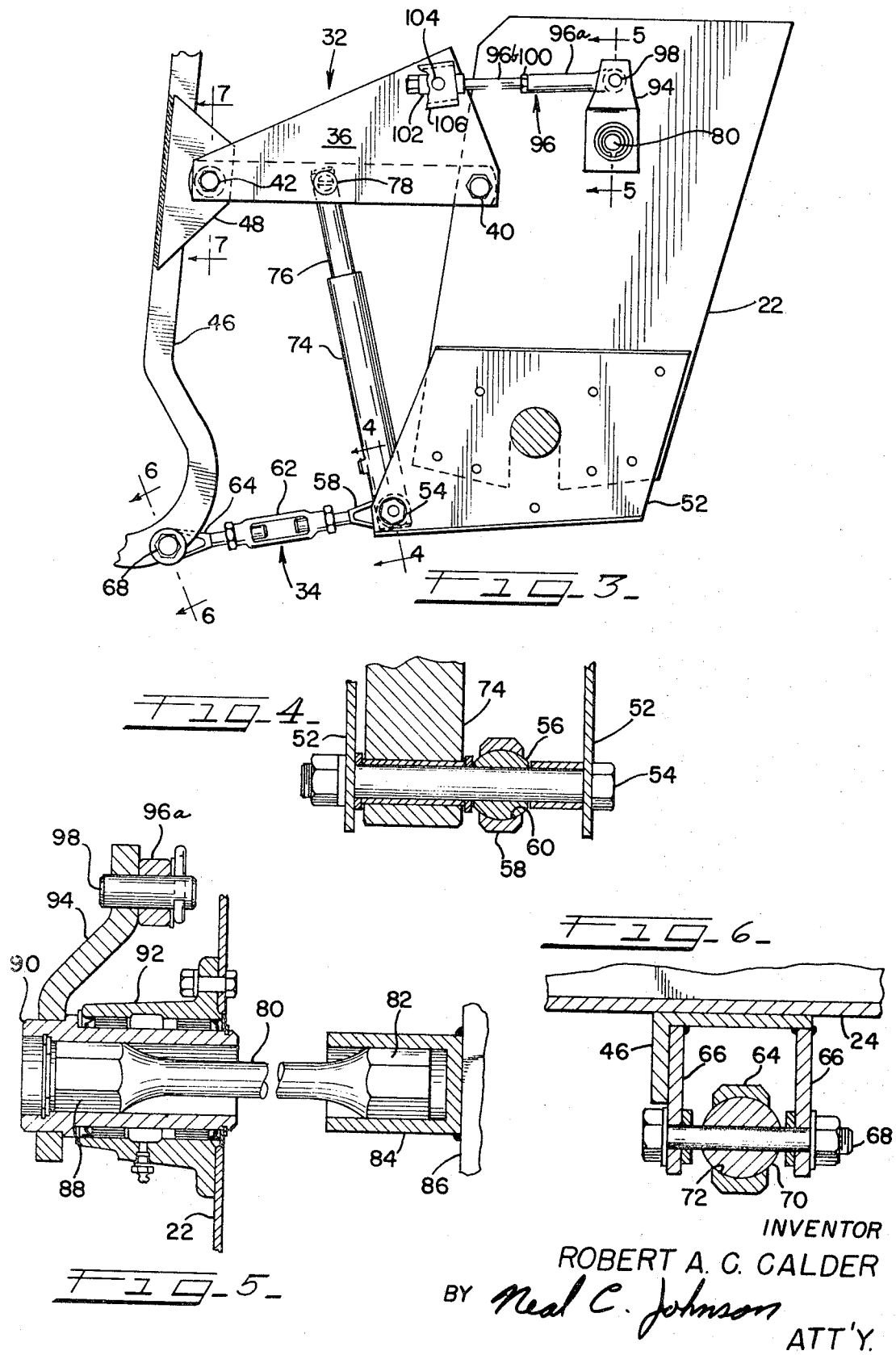

SUPPORT AND LINKAGE SYSTEM FOR HARVESTER PLATFORMS

BACKGROUND OF THE INVENTION

1. Field of the Invention

The invention relates to harvesting machines of the type which cut a standing crop and convey the same into a swath or windrow. More particularly, the invention relates to an improved system for floatably suspending a harvester platform from a wheeled frame or chassis.

2. Description of Prior Art

Harvester platforms for windrowers and the like are customarily suspended from the frame or chassis by means including elongated coil spring. The purpose of the springs is to yieldably support the platform so that it will move vertically in response to changes in the ground contour. It is desirable that the platform adjust its vertical position throughout a considerable range of movement so that substantial variations in ground contour may be accommodated In order to obtain this result the coil springs are constructed of considerable length. This often requires that the platform be disposed at a considerable distance forwardly of the chassis to accommodate the springs thereby increasing the total length of the machine. A machine of substantial length is cumbersome to operate and difficult to maneuver in areas restricted in size. Moreover, the center of gravity of the machine is disposed toward the forward end thus increasing the tendency of the machine to tip forwardly during sudden stops.

The conventional use of coil springs also creates further problems in that the springs are easily excited into a harmonic vibrating condition as the machine is operated. This condition has resulted in breakage of the connections at each end of the springs.

A further problem associated with harvester platforms relates to the manner in which the platform adjusts its orientation relative to the machine chassis in response to variations in the ground level in a profile transverse to the direction of travel of the machine. The problem resides in mounting the platform on the chassis with sufficient flexibility to permit the opposite ends of the platform to move vertically independently of each other.

SUMMARY

The invention provides an improved suspension and linkage system for a harvester platform wherein torsion bar assemblies floatably support the platform. The use of conventional coil springs has been eliminated along with the above-mentioned associated problems. The suspension and linkage system includes universal connections between the chassis frame and the platform permitting the opposite ends of the platform to move vertically independently of each other. Accordingly, the platform readily adjusts its position in response to ground level variations transversely of the direction of travel of the machine. The suspension and linkage system also includes adjustable means whereby the attitude or angular relation of the platform to the ground in the direction of travel may be varied.

Briefly, the objects of the invention are to provide a suspension and linkage system for a harvester platform in which the use of conventional coil springs is eliminated; the platform is flexibly mounted for tilting transversely to the direction of travel; and the platform is readily adjustable to very its angular relation to the ground in the direction of travel of the machine.

BRIEF DESCRIPTION OF THE DRAWINGS

FIG. 1 is a side elevation view partly in cross section of a self-propelled windrower having the suspension and linkage system of the invention;

FIG. 2 is a fragmentary plan view of the suspension and linkage system;

FIG. 3 is an enlarged side elevation view of the suspension and linkage system of FIG. 1;

FIG. 4 is a fragmentary cross-sectional view taken in the direction of arrows 4—4 of FIG. 3;

FIG. 5 is a fragmentary cross-sectional view taken in the direction of arrows 5—5 of FIG. 3;

FIG. 6 is a fragmentary cross-sectional view taken in the direction of arrows 6—6 of FIG. 3; and FIG. 7 is a fragmentary cross-sectional view taken in the direction of arrows 7—7 of FIG. 3.

DESCRIPTION OF THE PREFERRED EMBODIMENT

Referring first to FIG. 1 there is shown a windrower having a self-propelled chassis or frame 10 which includes an operator's station 12 and a motor 14. The chassis 10 is supported by a rear caster wheel assembly 16 and front drive wheels 18. As best shown in FIG. 2 the chassis 10 includes a transverse crossbeam 20 to which a pair of final-drive housings 22 are secured at each end thereof. The final-drive housings 22 extend downwardly from the crossbeam 20. The front drive wheels 18 are rotatably journaled on the final-drive housings 22 in the conventional manner.

Referring again to FIG. 1 it will be seen that the windrower includes a harvester platform 24 mounted on the chassis 10 forwardly thereof in the direction of travel of the machine. In accordance with conventional practice the platform 24 includes a reciprocating cutter assembly 26, a reel 28, and an auger conveyor 30 for cutting and conveying a standing crop into a swath or windrow.

The harvester platform 24 is mounted on the windrower chassis 10 by a novel suspension and linkage system to be now described. A pair of lift arm assemblies 32 extend forwardly from the upper portion of the final-drive housings 22 and are connected to the rearward end of the platform 24 proximate to the ends of the platform. A pair of lower link assemblies 34 extend forwardly from the lower portion of the final-drive housings 22 and are connected to the platform 24 proximate to the lower rear portion thereof. The lift arm assemblies 32 are identical to each other and thus a detailed description of one will suffice for both. The assembly 32 includes a pair of plates 36 and 38 pivotally connected to the final-drive housing 22 by a pin 40 and extend forwardly for connection to the platform 24. The forward ends of the plates 36 and 38 are joined by a pin 42 which carries a ball member 44 as shown in FIG. 7. The platform 24 includes an angle member 46 extending vertically along the rear portion and forwardly along the bottom portion as shown in FIG. 1. A gusset plate 48 is welded to the angle 46 and as best shown in FIG. 7 includes a socket 50 in which the ball 44 is swively received.

The lower link assemblies 34 are identical to each other and thus a detailed description of one will suffice for both. Each of the final-drive housings 22 includes a pair of plates 52 mounted on the lower portion thereof and extending forwardly as shown in FIG. 3. A bolt or pin 54 extends through the plates 52 and carries a ball member 56 thereon as shown in FIG. 4. A link member 58 is mounted on the ball member 56 by means of a socket portion 60 receiving the ball member. The forward end of the link 58 is threaded for receiving a turnbuckle 62 which similarly is threadedly connected to a link member 64. The details of the connection of link member 64 to the platform 24 are shown in FIG. 6. A pair of gusset plates 66 are welded to the angle member 46. A bolt or pin 68 is received through the plates 66 and carries a ball member 70. The link member 64 includes a socket 72 swively receiving the ball 70.

From the foregoing it will be apparent that the harvester platform 24 is mounted on the windrower chassis 10 by what might be termed a four-point, substantially parallel linkage. The above described ball and socket connections permit the platform to be tilted laterally relative to the chassis.

The platform 24 is movable vertically by means of a pair of hydraulic lift cylinder units 74 connected between the chassis 10 and the lift arm assemblies 32. As shown in detail in FIG. 4 the lower end of the cylinder unit 74 is journaled on the pin 54. As shown in FIGS. 2 and 3 the cylinder unit 74 includes a piston rod 76 coupled to the plates 36 and 38 by a pin 78. It will be apparent that the platform 24 is raised and lowered in response to extension and retraction respectively of the cylinder units 74.

The suspension and linkage system of the invention further includes means effective in torsion for floatably supporting the platform relative to the chassis frame. Toward that result there is provided a pair of torsion bar assemblies independently operative in conjunction with the pair of lift arm assemblies 32. As shown generally in FIG. 2 each of the torsion bar assemblies includes a torsion bar 80 disposed rearwardly of the crossbeam 20 transverse to the direction of travel of the windrower. The torsion bar 80 includes a hexagonal head 82 received in a complementary socket 84 welded to a centrally disposed member 86 of the chassis. The torsion bar 80 extends through the final-drive housing 22 and includes a hexagonal head 88 journaled for rotation relative to the fixed end of the bar. As shown in FIG. 5 the head 88 is received in a complementary socket 90 which is journaled by suitable bearings in a casing 92 bolted to the outside of the housing 22.

The torsion bar 80 is operatively connected to the arm assembly 32 by means to be now described. A torque arm 94 is rigidly secured on the socket member 90 and extends upwardly therefrom. A control rod 96 is pivotally connected to the outer end of the torque arm 94 by a pin 98 and extends forwardly for connection to the arm assembly 32. The control rod 96 is preferably constructed of two parts—member 96a connected to the torque arm 94 and a bolt 96b threadedly engaged with the member 96a. The threaded connection enables the length of the control rod to be varied as desired A locknut 100 serves to retain the rod 96 in the desired length. The bolt 96b is received through a collar 102 which is pivotally secured to the upper portion of the plate 36 by a pin 104. A U-shaped bracket 106 is welded to the bar 36 for supporting the pin 104.

OPERATION

The attitude of the harvester platform may be varied by adjusting the length of the lower links 34. This simply involves rotating the turnbuckles 62 so as to pivot the platform about the horizontal axis defined by the pin connections 42 until the desired attitude is attained.

The platform is movable vertically between lower operative positions and a raised transport position in response to extension and retraction of the cylinder units 74 through a suitable hydraulic power system incorporated into the windrower.

When the platform is disposed in the lower operative positions during a harvesting operation in the cylinder units 74 are exhausted of hydraulic fluid and the platform is floatably supported by the torsion bar assemblies. The length of the control rods 96 is preadjusted so that the collar 102 engages the head of the bolt 96b. The load is transmitted through the control rod 96 and torque arm 94 to the torsion bar 80. The torsional stress in the bar 80 yieldably supports the platform for vertical floating movement relative to the chassis frame of the windrower. The ball and socket connections permit the platform to tilt laterally in response to ground level variations transversely to the direction of travel.

The length of the control rod 96 is preadjusted such that as the platform is raised to a transport position the collar 102 slides rearwardly on the bolt 96b out of engagement with the bolt head. Thus a lost-motion connection is provided whereby the torsion bar 80 is not subjected to torsional stress when the platform is in its raised position. As the platform is lowered toward its operative position the collar 102 again engages the head of the bolt 96b imposing a torsional load on the bar 80 for floatably supporting the platform.

By the foregoing it will be seen that the suspension and linkage system of the invention provides a simple and effective means for supporting a harvester platform in a manner readily accommodating all working conditions.

I claim:

1. A crop harvester including a wheeled frame and a harvester platform mounted on said frame forwardly thereof in the direction of travel of the crop harvester, wherein the improvement comprises:
   arm means pivotally interconnecting said platform and said frame;
   lift means for raising said platform relative to said frame; and
   suspension means effective in torsion operatively interconnected between said frame and said arm means for floatably supporting said platform relative to said frame, said suspension means including a portion extending transversely to the direction of travel so as to define a transverse axis along which the torsion is effective.

2. A crop harvester including a wheeled frame and a harvester platform mounted on said frame forwardly thereof in the direction of travel of the crop harvester, wherein the improvement comprises:
   arm means pivotally interconnecting said platform and said frame;
   lift means for raising said platform relative to said frame; and
   suspension means effective in torsion operatively interconnected between said frame and said arm means for floatably supporting said platform relative to said frame, said suspension means including an elongate bar having an end fixed to said frame, a torque arm rigidly coupled to the other end of said bar, and a control rod pivotally coupled between said torque arm and said arm means, whereby downward movement of said platform is effective to induce torsional stress in said bar to yieldably resist said downward movement.

3. A crop harvester including a wheeled frame and a harvester platform mounted on said frame forwardly thereof in the direction of travel of the crop harvester, wherein the improvement comprises:
   a pair of lift arms pivotally connected to said frame and extending forwardly in coupled relation to said platform;
   a pair of lift cylinders coupled between said frame and said lift arms respectively for raising said platform relative to said frame; and
   a pair of torsion bars operatively coupled between said frame and said lift arms respectively for floatably suspending said platform relative to said frame.

4. The subject matter of claim 3, wherein said lift arms are disposed adjacent opposite end portions of said platform and coupled thereto by universal connections permitting each end portion to move in a generally vertical direction independently of the opposite end portion.

5. A windrower including an ambulatory frame, a harvester platform mounted on said frame forwardly thereof in the direction of travel of the windrower for harvesting a crop, wherein the improvement comprises:
   a pair of lift arms pivotally connected to said frame and extending forwardly therefrom for connection to said harvester platform;
   connection means coupling said lift arms to said platform about a horizontal axis;
   a pair of lift cylinders coupled between said frame and said lift arms respectively for raising said platform relative to said frame;
   a pair of torsion bars operatively coupled between said frame and said lift arms respectively for floatably suspending said platform relative to said frame; and
   longitudinally adjustable link means coupled between said frame and said platform for pivoting said platform about said axis for varying the attitude of said platform relative to said frame.

6. The subject matter of claim 5, wherein said connection means includes a ball and socket connections permitting independent vertical movement of the opposite ends of said platform.

7. The subject matter of claim 5, wherein each of said torsion bars includes an end anchored to said frame and an opposite end journaled for rotation, a torque arm coupled to said opposite end, and a control rod pivotally coupled between said torque arm and a respective one of said lift arms.

8. A windrower including a wheeled frame and a harvester platform mounted on said frame forwardly thereof in the direction of travel of the windrower for harvesting a crop, wherein the improvement comprises:
    arm means disposed in the direction of travel of the windrower pivotally interconnecting said platform and said frame;
    lift means for raising said platform relative to said frame between lower operative positions and a raised transport position; and
    suspension means effective in torsion operatively interconnected between said frame and said arm means for floatably supporting said platform relative to said frame in the operative positions, said suspension means including a portion extending transversely to the direction of travel so as to define a transverse axis along which the torsion is effective.

9. The subject matter of claim 8, wherein said suspension means includes a lost-motion connection permitting raising of the platform to its transport position without inducing torsional stress in said suspension means.

10. The subject matter of claim 8, wherein said arm means includes a pair of lift arms disposed adjacent opposite end portions of said platform and coupled thereto by universal connections permitting each end portion to move in a generally vertical direction independently of the opposite end portion.